(12) United States Patent
Takahashi et al.

(10) Patent No.: US 11,421,583 B2
(45) Date of Patent: Aug. 23, 2022

(54) TURBOCHARGER

(71) Applicant: TOYOTA JIDOSHA KABUSHIKI KAISHA, Toyota (JP)

(72) Inventors: Junya Takahashi, Nisshin (JP); Takeshi Murase, Iwakura (JP); Masaaki Matsuda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/473,632

(22) Filed: Sep. 13, 2021

(65) Prior Publication Data
US 2022/0154640 A1 May 19, 2022

(30) Foreign Application Priority Data
Nov. 18, 2020 (JP) .............................. JP2020-191699

(51) Int. Cl.
*F02B 37/22* (2006.01)
*F02B 37/18* (2006.01)

(52) U.S. Cl.
CPC ............ *F02B 37/22* (2013.01); *F02B 37/186* (2013.01); *F05D 2220/40* (2013.01)

(58) Field of Classification Search
CPC ..... F02B 37/22; F02B 37/186; F05D 2220/40
See application file for complete search history.

(56) References Cited

U.S. PATENT DOCUMENTS

| 2014/0366530 A1* | 12/2014 | Murayama | ............ F02B 37/183 60/602 |
| 2018/0209328 A1* | 7/2018 | Lotz | ...................... F02B 37/186 |
| 2020/0173351 A1 | 6/2020 | Saeki | |

FOREIGN PATENT DOCUMENTS

JP 2020-084923 A 6/2020

* cited by examiner

*Primary Examiner* — Audrey B. Walter
*Assistant Examiner* — Edward Bushard
(74) *Attorney, Agent, or Firm* — Oliff PLC (57) ABSTRACT

A turbocharger includes a turbine housing and a wastegate valve. The turbine housing defines a bypass passage. The turbine housing has a valve seat surface that is a flat surface that the wastegate valve contacts. The wastegate valve opens and closes the bypass passage. The wastegate valve has a valve surface that is a flat surface facing the valve seat surface. When the geometric center of the shape of an outer edge of the valve surface is called the valve center and the geometric center of the shape of an opening of the bypass passage in the valve seat surface is called the opening center, the shortest distance from the valve center to a central axis of the shaft is longer than the shortest distance from the opening center to the central axis of the shaft.

3 Claims, 5 Drawing Sheets

TURBOCHARGER

CROSS-REFERENCE TO RELATED APPLICATION

This application claims priority to Japanese Patent Application No. 2020-191699 filed on Nov. 18, 2020, incorporated herein by reference in its entirety.

BACKGROUND

1. Technical Field

The present disclosure relates to a turbocharger.

2. Description of Related Art

The turbocharger described in Japanese Unexamined Patent Application Publication No. 2020-084923 (JP 2020-084923 A) includes a turbine wheel, a turbine housing, and a wastegate valve. The turbine housing houses the turbine wheel. The turbine housing defines bypass passages. The bypass passages provide a bypass between an exhaust gas upstream side and an exhaust gas downstream side relative to the turbine wheel. The turbine housing has a valve seat surface that contacts the wastegate valve when the wastegate valve is in a closed state. Further, the turbine housing has a through-hole that extends through a wall of the turbine housing.

The wastegate valve opens and closes the bypass passages. The wastegate valve includes a shaft and a valve body. The shaft extends through the through-hole and is rotatably supported by the turbine housing. The valve body extends in a radial direction of the shaft from an end of the shaft that is located inside the turbine housing. The valve body has a valve surface that is a flat surface facing the valve seat surface when the wastegate valve is in the closed state. The shaft and the valve body are an integrally molded part.

SUMMARY

In a turbocharger like JP 2020-084923 A, the turbine housing and the wastegate valve can have manufacturing errors. An excessive manufacturing error would prevent the valve seat surface and the valve surface from contacting each other as designed when the wastegate valve is in the closed state, so that a large amount of exhaust gas leaks. In particular, if the valve surface interferes with the valve seat surface before the wastegate valve fully closes, a wide gap is left between the valve seat surface and the valve surface, leading to a significant leakage of exhaust gas.

A turbocharger for solving this problem includes: a turbine wheel that is rotated by a flow of exhaust gas; a turbine housing that houses the turbine wheel and defines a bypass passage that provides a bypass between an exhaust gas upstream side and an exhaust gas downstream side relative to the turbine wheel; and a wastegate valve that opens and closes the bypass passage. The turbine housing has a valve seat surface that is a flat surface contacting the wastegate valve when the wastegate valve is in a closed state, and a through-hole that extends through a wall of the turbine housing. The wastegate valve has a shaft that extends through the through-hole and is rotatably supported by the turbine housing, and a valve body that extends in a radial direction of the shaft from an end of the shaft that is located inside the turbine housing. The valve body has a valve surface that is a flat surface facing the valve seat surface when the wastegate valve is in the closed state. The shaft and the valve body are an integrally molded part. When the wastegate valve is in the closed state, an entire opening of the bypass passage is covered by the valve body as seen from a direction orthogonal to the valve seat surface. When the geometric center of the shape of an outer edge of the valve surface is called the valve center and the geometric center of the shape of the opening of the bypass passage in the valve seat surface is called the opening center, the shortest distance from the valve center to a central axis of the shaft is longer than the shortest distance from the opening center to the central axis of the shaft.

In this turbocharger, if the valve surface interferes with the valve seat surface before the wastegate valve fully closes, a gap is left between the valve surface and the valve seat surface at a farther position than the opening of the bypass passage as seen from the central axis of the shaft. Therefore, part of exhaust gas leaking out of the bypass passage flows in a direction away from the shaft. According to the above-described relationship between the valve center and the opening center, the valve surface has a large area at a farther position than the opening of the bypass passage as seen from the central axis of the shaft. As a result, the presence of the valve surface obstructs the exhaust gas that flows in the direction away from the shaft, and thus the amount of exhaust gas leaking out of the bypass passage can be reduced.

In the above configuration, when the geometric center of the shape of an outer edge of the valve seat surface is called the valve seat center, the shortest distance from the valve seat center to the central axis of the shaft may be longer than the shortest distance from the opening center to the central axis of the shaft.

In this configuration, the valve seat surface is present at a farther position than the opening of the bypass passage as seen from the central axis of the shaft. Therefore, if the valve surface interferes with the valve seat surface before the wastegate valve fully closes, a narrow passage is defined by the valve seat surface and the valve surface at a farther position than the opening of the bypass passage as seen from the central axis of the shaft. As the exhaust gas experiences high flow resistance in this passage, the amount of exhaust gas leaking out of the bypass passage can be reduced.

In the above configuration, the maximum dimension of the opening of the bypass passage in a direction orthogonal to the central axis of the shaft may be smaller than the maximum dimension of the opening of the bypass passage in a direction along the central axis of the shaft.

In this configuration, the above-described positional relationship between the valve center and the opening center can be easily realized, without the dimension of the valve surface in the direction orthogonal to the central axis of the shaft being excessively increased.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

General Configuration of Internal Combustion Engine

One embodiment of the present disclosure will be described below in accordance with FIG. 1 to FIG. 8. First, the general configuration of an internal combustion engine 10 of a vehicle to which a turbocharger 20 of the present disclosure is applied will be described.

Figure 1:
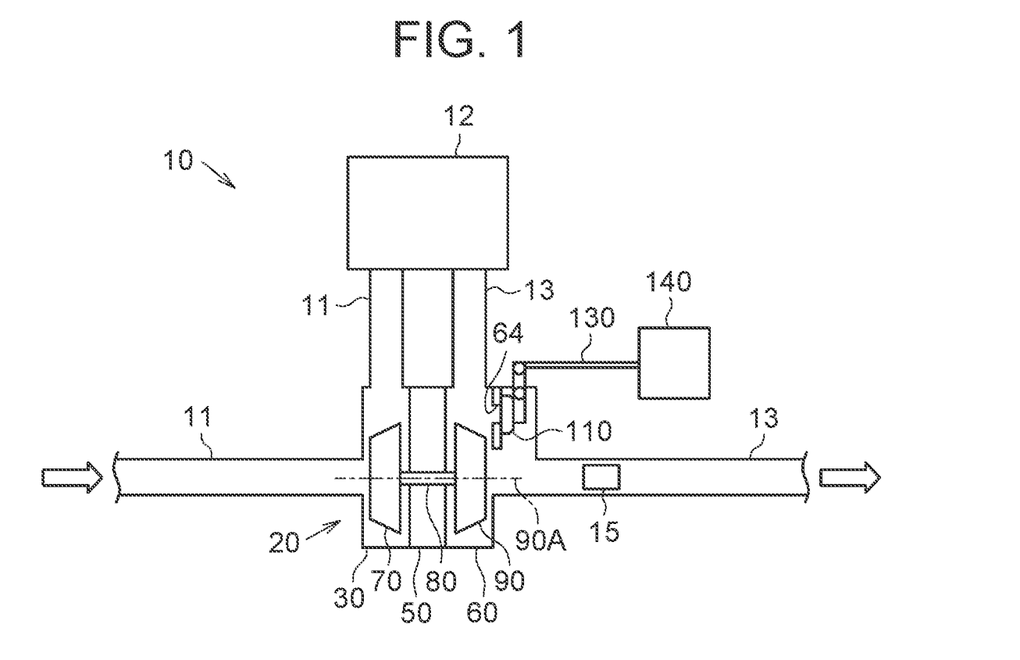
FIG. 1 is a schematic view of an internal combustion engine.

As shown in FIG. 1, the internal combustion engine 10 includes an intake passage 11, a cylinder 12, an exhaust passage 13, a catalyst 15, and the turbocharger 20. The intake passage 11 introduces intake air from an outside of the internal combustion engine 10. The cylinder 12 is connected to the intake passage 11. In the cylinder 12, fuel and the intake air are mixed and combusted. The exhaust passage 13 is connected to the cylinder 12. The exhaust passage 13 discharges exhaust gas from the cylinder 12. The catalyst 15 is located at an intermediate portion of the exhaust passage 13. The catalyst 15 removes harmful components from the exhaust gas flowing through the exhaust passage 13.

The turbocharger 20 includes a compressor housing 30, a bearing housing 50, a turbine housing 60, a compressor wheel 70, a coupling shaft 80, and a turbine wheel 90.

The compressor housing 30 is mounted at an intermediate portion of the intake passage 11. The turbine housing 60 is mounted at a portion of the exhaust passage 13, upstream of the catalyst 15. The bearing housing 50 is fixed to each of the compressor housing 30 and the turbine housing 60 and connects the compressor housing 30 and the turbine housing 60 to each other. Thus, the turbocharger 20 is provided across the intake passage 11 and the exhaust passage 13.

The turbine housing 60 houses the turbine wheel 90. The bearing housing 50 houses the coupling shaft 80. The bearing housing 50 rotatably supports the coupling shaft 80 through a bearing (not shown). A first end of the coupling shaft 80 is connected to the turbine wheel 90. The compressor housing 30 houses the compressor wheel 70. The compressor wheel 70 is connected to a second end of the coupling shaft 80. Thus, the compressor wheel 70 is coupled to the turbine wheel 90 through the coupling shaft 80.

When the turbine wheel 90 is rotated by exhaust gas flowing through an inside of the turbine housing 60, the compressor wheel 70 is rotated along with the turbine wheel 90 through the coupling shaft 80. As the compressor wheel 70 rotates, the intake air inside the compressor housing 30 is compressed.

Configuration of Turbocharger

Next, the specific configuration of the turbocharger 20 will be described.

Figure 2:
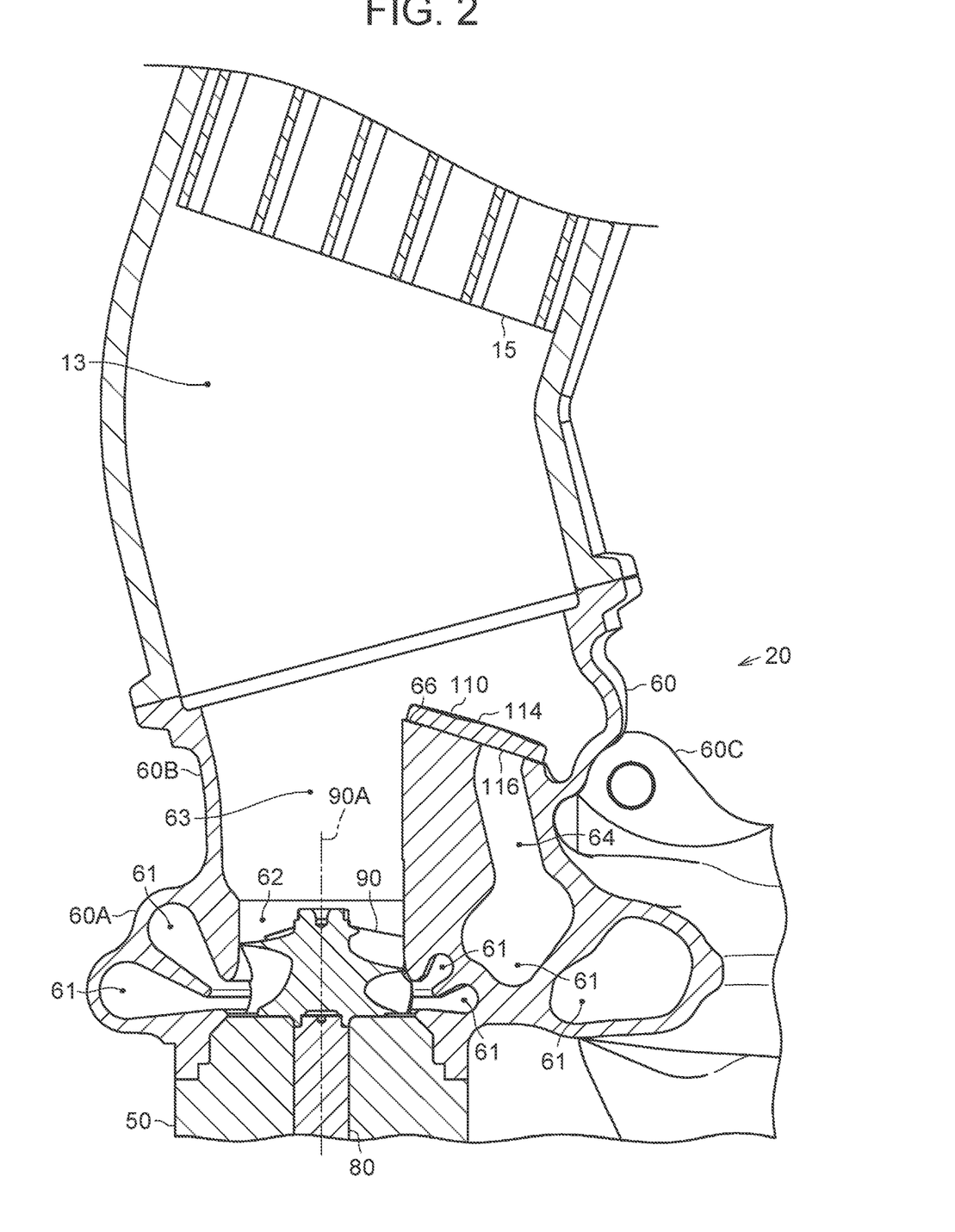
FIG. 2 is a sectional view showing a configuration around a turbine housing.

As shown in FIG. 2, the turbine housing 60 includes an arc part 60A, a tubular part 60B, and a flange part 60C. The tubular part 60B has a substantially cylindrical shape. The tubular part 60B extends roughly along a rotational axis 90A that is the center of rotation of the turbine wheel 90. The arc part 60A extends so as to surround the outer circumference of the tubular part 60B and has a substantially arc shape. The flange part 60C is located at an upstream end of the arc part 60A. The flange part 60C is fixed to the exhaust passage 13 at a portion on an upstream side relative to the turbine housing 60.

As shown in FIG. 2, the turbine housing 60 defines, as space for the exhaust gas to flow through, two scroll passages 61, a housing space 62, an exhaust passage 63, and two bypass passages 64. In FIG. 2, one bypass passage 64 is shown. Each scroll passage 61 is located inside the arc part 60A and the tubular part 60B. The scroll passages 61 extend in an arc shape so as to surround the turbine wheel 90. Upstream ends of the scroll passages 61 are connected to the exhaust passage 13, on the upstream side relative to the turbine housing 60. Downstream ends of the scroll passages 61 are connected to the housing space 62. The two scroll passages 61 extend substantially parallel to each other. The housing space 62 is a part of an internal space of the tubular part 60B in which the turbine wheel 90 is located. The housing space 62 is connected to the exhaust passage 63. The exhaust passage 63 is a part of the internal space of the tubular part 60B that includes an end of the tubular part 60B on the opposite side from the bearing housing 50, i.e., the upper end thereof in FIG. 2. A downstream end of the exhaust passage 63 is connected to the exhaust passage 13, on the downstream side relative to the turbine housing 60. Each bypass passage 64 is located inside the arc part 60A and the tubular part 60B. Each bypass passage 64 connects the scroll passage 61 and the exhaust passage 63 to each other. Thus, the bypass passages 64 provide a bypass between an exhaust gas upstream side and an exhaust gas downstream side relative to the turbine wheel 90.

Figure 3:
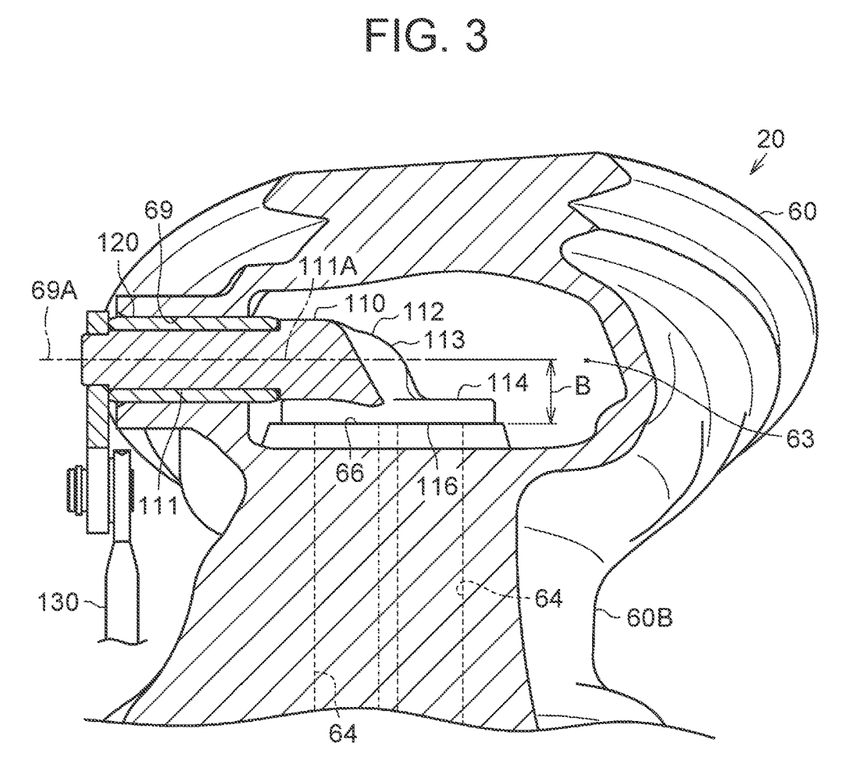
FIG. 3 is a sectional view showing a configuration around a wastegate valve.
Figure 4:
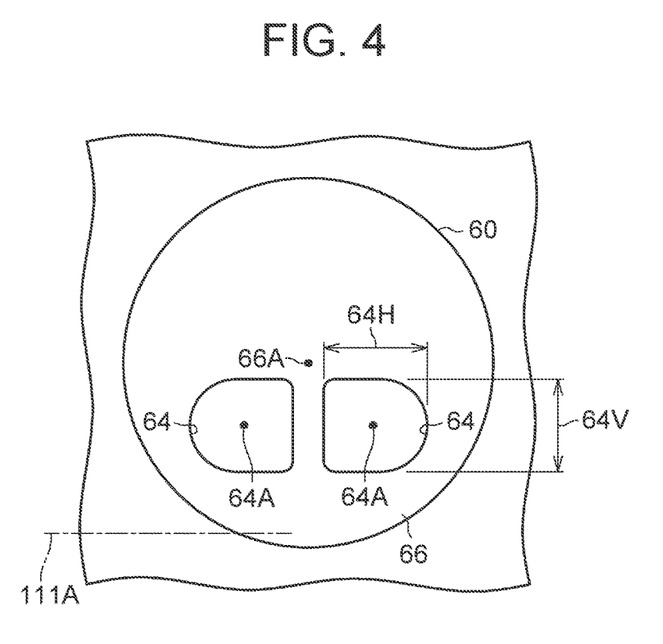
FIG. 4 is a plan view showing a configuration around a valve seat surface.

As shown in FIG. 3, the turbine housing 60 includes a valve seat surface 66 and a through-hole 69. As shown in FIG. 4, the valve seat surface 66 is a part of an inner wall surface of the turbine housing 60 defining the exhaust passage 63 and is a flat surface surrounding opening edges of the two bypass passages 64. Thus, each bypass passage 64 opens in the valve seat surface 66. An outer edge of the valve seat surface 66 has a substantially circular shape. As shown in FIG. 3, a part of an inner surface of the turbine housing 60 that includes the valve seat surface 66 is raised compared with other portions.

As shown in FIG. 3, the through-hole 69 extends through a wall of the turbine housing 60. The through-hole 69 is located at a part of the wall of the turbine housing 60 that defines the exhaust passage 63. A central axis 69A of the through-hole 69 is parallel to the valve seat surface 66. The central axis 69A of the through-hole 69 extends in a direction in which the two adjacent bypass passages 64 are located side by side, i.e., in the left-right direction in FIG. 3. When seen from a direction along the central axis 69A of the through-hole 69, the through-hole 69 has a substantially circular shape.

As shown in FIG. 1 and FIG. 3, the turbocharger 20 includes a wastegate valve 110, a bush 120, a link mechanism 130, and an actuator 140. As shown in FIG. 3, the bush 120 has a substantially cylindrical shape. The outside diameter of the bush 120 is substantially equal to the inside diameter of the through-hole 69. The bush 120 is located inside the through-hole 69.

As shown in FIG. 3, the wastegate valve 110 includes a shaft 111 and a valve body 112. The shaft 111 has a substantially columnar shape. The outside diameter of the shaft 111 is substantially equal to the inside diameter of the bush 120. The shaft 111 is passed through the bush 120. Thus, the shaft 111 extends through the through-hole 69 of the turbine housing 60. The turbine housing 60 rotatably supports the shaft 111 through the bush 120. A central axis 111A of the shaft 111 coincides with the central axis 69A of the through-hole 69.

Figure 5:
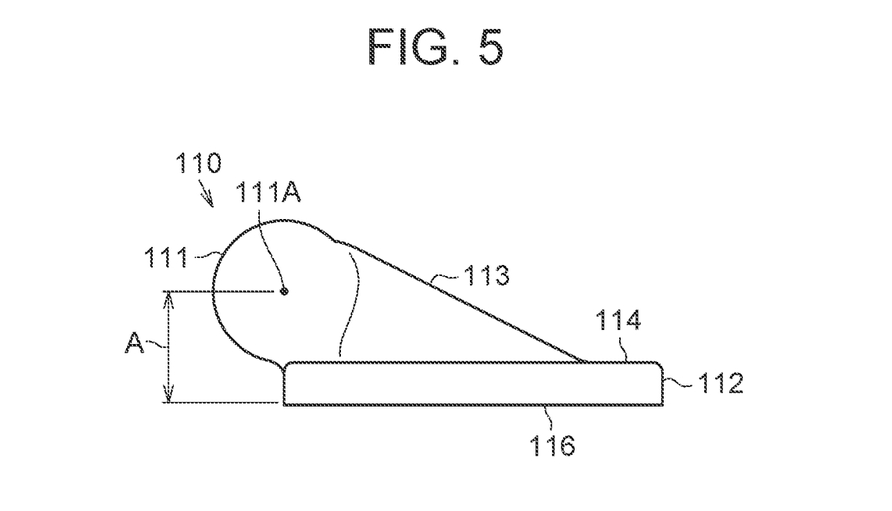
FIG. 5 is a side view of the wastegate valve.
Figure 6:
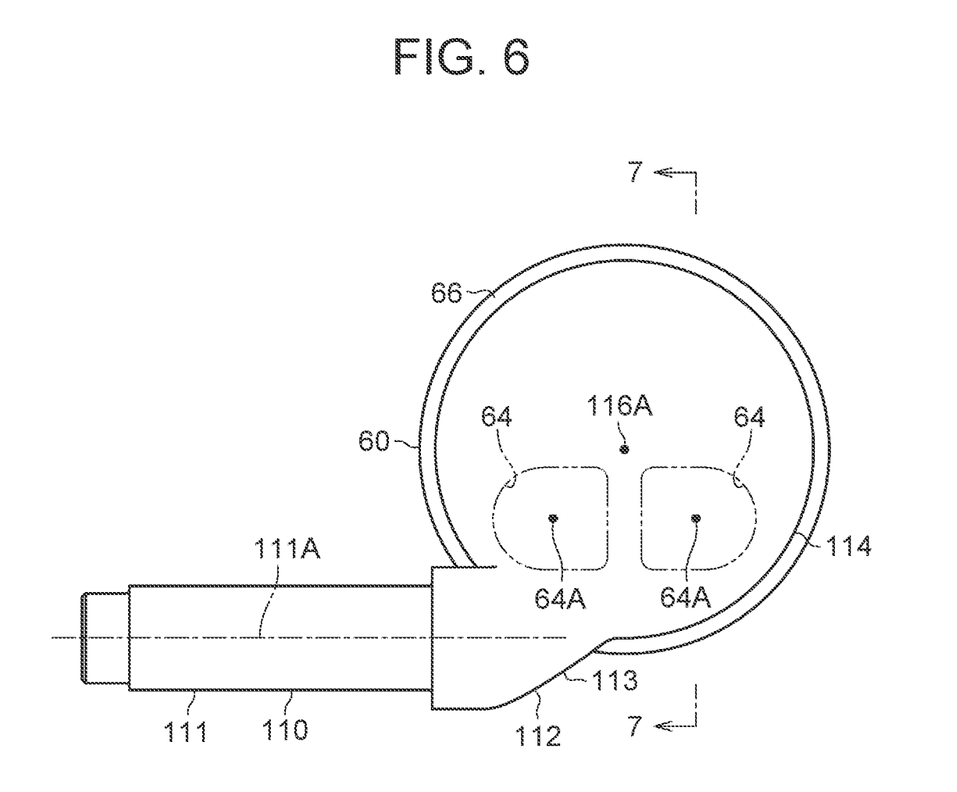
FIG. 6 is a view illustrating a configuration around the wastegate valve.

As shown in FIG. 5, the valve body 112 includes a connection part 113 and a valve main body 114. The connection part 113 extends from the shaft 111 in a radial direction of the shaft 111. As shown in FIG. 3, the connection part 113 is located at an end of the shaft 111 that is located inside the turbine housing 60, i.e., at the right end of the shaft 111 in FIG. 3. As shown in FIG. 5, the valve main body 114 is connected to an end of the connection part 113 that is located on a radially outer side of the shaft 111. As shown in FIG. 6, the valve main body 114 has a substantially circular plate shape. As shown in FIG. 5, a surface of the valve main body 114 on the opposite side from the connection part 113, i.e., the lower surface thereof in FIG. 5 functions as a valve surface 116. The valve surface 116 is a flat surface. An outer edge of the valve surface 116 has a substantially circular shape. The shape of the outer edge of the valve surface 116 is large enough to cover entire openings of the two bypass passages 64 that open in the valve seat surface 66. That is, as shown in FIG. 6, when the wastegate valve 110 is in a closed state, the valve main body 114 of the valve body 112 covers the entire openings of the two bypass passages 64 as seen from a direction orthogonal to the valve seat surface 66. The valve surface 116 faces the valve seat surface 66 when the wastegate valve 110 is in the closed state. The wastegate valve 110 is an integrally molded part in which the shaft 111 and the valve body 112 are integrally molded. The wastegate valve 110 is integrally molded, for example, by casting.

Here, as shown in FIG. 5, a distance from an imaginary plane including the valve surface 116 to the central axis 111A of the shaft 111 in a direction orthogonal to the valve surface 116 will be called a distance A. As shown in FIG. 3, a distance from an imaginary plane including the valve seat surface 66 to the central axis 69A of the through-hole 69 in a direction orthogonal to the valve seat surface 66 will be called a distance B. In this embodiment, the distance A is equal to the distance B by design.

As shown in FIG. 3, the link mechanism 130 is coupled to an end of the shaft 111 that is located outside the turbine housing 60. As shown in FIG. 1, the actuator 140 is coupled to the link mechanism 130. The actuator 140 transmits a driving force to the link mechanism 130. The link mechanism 130 transmits the driving force from the actuator 140 to the wastegate valve 110 to open or close the bypass passages 64.

Specifically, when the wastegate valve 110 shifts from an open state to a closed state, the driving force of the actuator 140 is transmitted to the shaft 111 through the link mechanism 130, so that the shaft 111 rotates in a first rotation direction of circumferential directions of the shaft 111 relatively to the turbine housing 60. Then, the valve surface 116 of the wastegate valve 110 contacts the valve seat surface 66 of the turbine housing 60. Thus, when the wastegate valve 110 is in the closed state, the valve surface 116 of the wastegate valve 110 faces the valve seat surface 66 of the turbine housing 60, so that the downstream ends of the bypass passages 64 are covered by the valve surface 116 of the wastegate valve 110. In this embodiment, the closed state is a state where the valve surface 116 of the wastegate valve 110 contacts the valve seat surface 66 of the turbine housing 60 and the wastegate valve 110 cannot rotate any further toward the closing side.

On the other hand, when the wastegate valve 110 shifts from the closed state to the open state, the driving force of the actuator 140 is transmitted to the shaft 111 through the link mechanism 130, so that the shaft 111 rotates in a second rotation direction of the circumferential directions of the shaft 111 relatively to the turbine housing 60. Then, the valve surface 116 of the wastegate valve 110 is separated from the valve seat surface 66 of the turbine housing 60. Thus, when the wastegate valve 110 is in the open state, the downstream ends of the bypass passages 64 are not covered by the valve surface 116 of the wastegate valve 110.

Shape of Bypass Passages

Next, the shapes of the openings of the bypass passages 64 in the valve seat surface 66 will be specifically described.

As shown in FIG. 4, the openings of the two bypass passages 64 are located side by side in the direction along the central axis 111A of the shaft 111. When seen from the direction orthogonal to the valve seat surface 66, the opening of each bypass passage 64 has a roughly elliptical shape. Specifically, the maximum value of one of the dimensions of the opening of the bypass passage 64 in a direction along the central axis 111A of the shaft 111 as seen from the direction orthogonal to the valve seat surface 66 will be referred to as a maximum dimension 64H. The maximum value of one of the dimensions of the opening of the bypass passage 64 in a direction orthogonal to the central axis 111A of the shaft 111 will be referred to as a maximum dimension 64V. In this case, the maximum dimension 64V is smaller than the maximum dimension 64H. The maximum dimension 64V is, for example, about 60% to 90% of the maximum dimension 64H. The shapes of the openings of the two bypass passages 64 are line-symmetrical with respect to an imaginary line drawn between the two bypass passages 64.

Positions of Bypass Passages Etc.

Next, positional relationships among the bypass passages 64, the valve seat surface 66, and the valve surface 116 will be specifically described.

As shown in FIG. 4, the geometric center of the shape of the opening of each bypass passage 64 in the valve seat surface 66 as seen from the direction orthogonal to the valve seat surface 66 will be referred to as an opening center 64A. The geometric center of the shape of the outer edge of the valve seat surface 66 will be referred to as a valve seat center 66A. Since the outer edge of the valve seat surface 66 has a substantially circular shape, the valve seat center 66A substantially coincides with the center of the circular shape. Further, as shown in FIG. 6, the geometric center of the shape of the outer edge of the valve surface 116 as seen from the direction orthogonal to the valve surface 116 will be referred to as a valve center 116A. Since the outer edge of the valve surface 116 has a substantially circular shape, the valve center 116A substantially coincides with the center of the circular shape.

Figure 7:
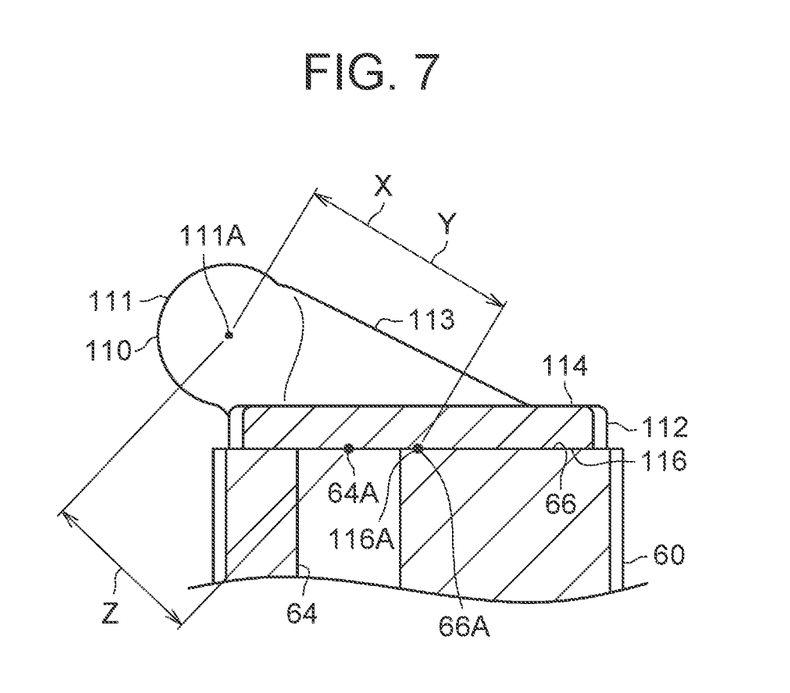
FIG. 7 is a view illustrating a configuration of the wastegate valve etc. in a section taken along line 7-7 in FIG. 6.

As shown in FIG. 7, a shortest distance X from the valve center 116A to the central axis 111A of the shaft 111 is longer than a shortest distance Z from the opening center 64A to the central axis 111A of the shaft 111. Further, a shortest distance Y from the valve seat center 66A to the central axis 111A of the shaft 111 is longer than the shortest distance Z. In this embodiment, the shortest distance X is equal to the shortest distance Y.

Workings of Embodiment

Figure 8:
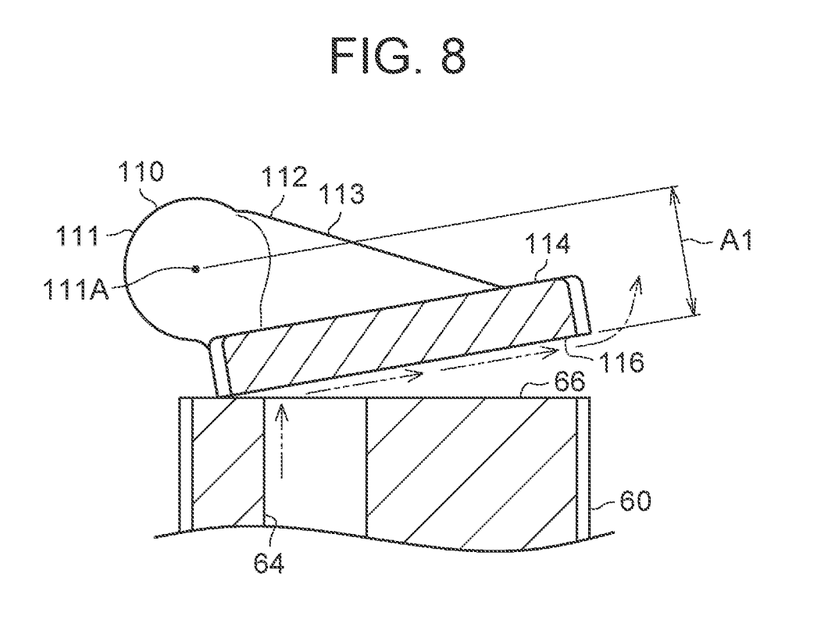
FIG. 8 is a view illustrating a configuration of the wastegate valve etc. in a section.

In the turbocharger 20, even when the distance A and the distance B are equal by design, these distances can differ from each other due to factors such as manufacturing errors of the turbine housing 60 and the wastegate valve 110. In this case, the valve surface 116 does not make surface contact with the valve seat surface 66 when the wastegate valve 110 is in the closed state, so that a gap is left between the valve surface 116 and the valve seat surface 66. In particular, as shown in FIG. 8, if an actual distance A1 is longer than the distance A that is a design value, the valve surface 116 interferes with the valve seat surface 66 before the wastegate valve 110 fully closes. In this case, a wide gap is left between the valve surface 116 and the valve seat surface 66 at a farther position than the openings of the bypass passages 64 as seen from the central axis 111A of the shaft 111. Therefore, as indicated by long dashed double-short dashed arrows in FIG. 8, exhaust gas having flowed from the bypass passages 64 to the gap between the valve surface 116 and the valve seat surface 66 flows along the valve surface 116, largely in a direction away from the shaft 111, i.e., toward the right side in FIG. 8. Then, the exhaust gas having flowed near the valve surface 116 leaks out to the exhaust passage 63.

Effects of Embodiment (1) In this embodiment, as shown in FIG. 7, the shortest distance X from the valve center 116A to the central axis 111A of the shaft 111 is longer than the shortest distance Z from the opening center 64A to the central axis 111A of the shaft 111. In this configuration, the valve surface 116 has a large area at a farther position than the openings of the bypass passages 64 as seen from the central axis 111A of the shaft 111. As a result, the presence of the valve surface 116 obstructs the exhaust gas flowing in the direction away from the shaft 111, and thus the amount of exhaust gas leaking out of the bypass passages 64 can be reduced.

(2) In this embodiment, as shown in FIG. 7, the shortest distance Y from the valve seat center 66A to the central axis 111A of the shaft 111 is longer than the shortest distance Z from the opening center 64A to the central axis 111A of the shaft 111. In this configuration, the valve seat surface 66 is present at a farther position than the openings of the bypass passages 64 as seen from the central axis 111A of the shaft 111. Therefore, as shown in FIG. 8, if the valve surface 116 interferes with the valve seat surface 66 before the wastegate valve 110 fully closes, a narrow passage is defined by the valve seat surface 66 and the valve surface 116 at a farther position than the openings of the bypass passages 64 as seen from the central axis 111A of the shaft 111. In the above configuration, the distance of the narrow passage defined by the valve seat surface 66 and the valve surface 116 is long. As the exhaust gas experiences high flow resistance in this passage, the amount of exhaust gas leaking out of the bypass passages 64 can be reduced.

(3) In this embodiment, the maximum dimension 64V is smaller than the maximum dimension 64H. This configuration reduces the need for increasing the dimension of the valve surface 116 in the direction orthogonal to the central axis 111A of the shaft 111, i.e., in the up-down direction in FIG. 6 to adopt the configuration in which the shortest distance X is longer than the shortest distance Z. Thus, the above-described positional relationship between the valve center 116A and the opening center 64A can be easily realized, without the dimension of the valve surface 116 in the direction orthogonal to the central axis 111A of the shaft 111 being excessively increased.

Modified Examples

The embodiment can be implemented with the following changes made thereto. The embodiment and the following modified examples can be implemented in combination to such an extent that no technical inconsistency arises.

Shape of Wastegate Valve 110

The shape of the wastegate valve 110 can be changed as necessary. For example, as long as the valve main body 114 has the flat valve surface 116, the wastegate valve 110 may have a part that protrudes from the valve surface 116 or a part that is depressed from the valve surface 116.

Shape of Turbine Housing 60

The shape of the turbine housing 60, particularly the shape thereof around the valve seat surface 66 can be changed as necessary. For example, as long as the turbine housing 60 has the flat valve seat surface 66, the turbine housing 60 may have a part that is depressed from the valve seat surface 66.

Positional Relationship Between Valve Seat Surface 66 and Valve Surface 116

In the above embodiment, the distance A and the distance B are designed to be equal. However, the distance A and the distance B may be designed to have different values. That is, the valve seat surface 66 and the valve surface 116 may be designed not to make surface contact with each other. From the viewpoint of preventing the valve surface 116 from interfering with the valve seat surface 66 before the wastegate valve 110 fully closes, it is preferable that the distance A be equal to or shorter than the distance B.

Shortest Distance Y and Shortest Distance Z

In the above embodiment, the shortest distance Y may be equal to or shorter than the shortest distance Z. Also in this configuration, if the shortest distance X is longer than the shortest distance Z, the amount of exhaust gas leaking out of the bypass passages 64 can be reduced by the presence of the valve surface 116 that is located at a farther position than the openings of the bypass passages 64.

Bypass Passages 64

In the above embodiment, the shape of the opening of each bypass passage 64 in the valve seat surface 66 can be changed as necessary. For example, the maximum dimension 64V may be equal to the maximum dimension 64H or larger than the maximum dimension 64H. Also in this case, the above-described positional relationship between the valve center 116A and the opening center 64A can be realized by setting the size of the valve surface 116 according to the size of the bypass passages 64. Further, the above-described positional relationship between the valve seat center 66A and the opening center 64A can be realized by setting the size of the valve seat surface 66 according to the size of the bypass passages 64.

In the above embodiment, the shape of the opening of each bypass passage 64 can be changed. For example, the opening of each bypass passage 64 may have a perfectly circular shape or a polygonal shape.

In the above embodiment, the number of the bypass passages 64 can be changed. For example, the number of the bypass passages 64 may be one, or three or more. When more than one bypass passage 64 is provided, the requirement that the shortest distance X be longer than the shortest distance Z should be met in at least one of the bypass passages 64.

What is claimed is:

1. A turbocharger comprising:
a turbine wheel that is rotated by a flow of exhaust gas;
a turbine housing that houses the turbine wheel and defines a bypass passage that provides a bypass between an exhaust gas upstream side and an exhaust gas downstream side relative to the turbine wheel; and
a wastegate valve that opens and closes the bypass passage,
the turbine housing having a valve seat surface that is a flat surface contacting the wastegate valve when the wastegate valve is in a closed state, and a through-hole that extends through a wall of the turbine housing,
the wastegate valve having a shaft that extends through the through-hole and is rotatably supported by the turbine housing, and a valve body that extends in a radial direction of the shaft from an end of the shaft that is located inside the turbine housing,
the valve body having a valve surface that is a flat surface facing the valve seat surface when the wastegate valve is in the closed state,
the shaft and the valve body being an integrally molded part, wherein:
when the wastegate valve is in the closed state, an entire opening of the bypass passage is covered by the valve body as seen from a direction orthogonal to the valve seat surface; and
when a geometric center of a shape of an outer edge of the valve surface is called a valve center and a geometric center of a shape of the opening of the bypass passage in the valve seat surface is called an opening center, a shortest distance from the valve center to a central axis of the shaft is longer than a shortest distance from the opening center to the central axis of the shaft.

2. The turbocharger according to claim 1, wherein when a geometric center of a shape of an outer edge of the valve seat surface is called a valve seat center, a shortest distance from the valve seat center to the central axis of the shaft is longer than the shortest distance from the opening center to the central axis of the shaft.

3. The turbocharger according to claim 1, wherein a maximum dimension of the opening of the bypass passage in a direction orthogonal to the central axis of the shaft is smaller than a maximum dimension of the opening of the bypass passage in a direction along the central axis of the shaft.

* * * * *